(12) United States Patent
Kudo et al.

(10) Patent No.: US 8,027,516 B2
(45) Date of Patent: Sep. 27, 2011

(54) IMAGE FORMING APPARATUS INCLUDING POSITION DETECTOR

(75) Inventors: Koichi Kudo, Tokyo (JP); Hideyuki Takayama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 905 days.

(21) Appl. No.: 11/581,517

(22) Filed: Oct. 17, 2006

(65) Prior Publication Data

US 2007/0086679 A1   Apr. 19, 2007

(30) Foreign Application Priority Data

Oct. 17, 2005 (JP) ................................. 2005-301128
Sep. 19, 2006 (JP) ................................. 2006-252385

(51) Int. Cl.
G01C 17/38 (2006.01)
G01C 25/00 (2006.01)
G01P 21/00 (2006.01)
G06K 9/00 (2006.01)

(52) U.S. Cl. ............................. 382/107; 702/94; 702/97
(58) Field of Classification Search .................... None
See application file for complete search history.

(56) References Cited

U.S. PATENT DOCUMENTS

| | | | | |
|---|---|---|---|---|
| 4,161,781 A * | 7/1979 | Hildebrandt et al. | ......... | 702/164 |
| 4,638,371 A * | 1/1987 | Milch | ............................. | 358/474 |
| 4,931,828 A * | 6/1990 | Fujita et al. | ..................... | 355/45 |
| 4,987,776 A * | 1/1991 | Koon | ......................... | 73/304 C |
| 5,056,922 A * | 10/1991 | Cielo et al. | ................... | 356/604 |
| 5,280,542 A * | 1/1994 | Ozeki et al. | .................. | 382/154 |
| 5,420,944 A * | 5/1995 | Concannon et al. | .......... | 382/317 |
| 5,430,665 A * | 7/1995 | Jin et al. | ......................... | 702/163 |
| 5,734,108 A * | 3/1998 | Walker et al. | .................... | 73/650 |
| 5,937,079 A * | 8/1999 | Franke | ........................ | 382/103 |
| 5,945,655 A * | 8/1999 | Gilgeous et al. | ............... | 235/454 |
| 6,021,209 A * | 2/2000 | Hirabayashi et al. | ......... | 382/103 |
| 6,342,909 B1 * | 1/2002 | Joichi et al. | .................... | 347/129 |
| 6,509,560 B1 * | 1/2003 | Glenn et al. | .................... | 250/239 |
| 6,556,722 B1 * | 4/2003 | Russell et al. | ................. | 382/291 |
| 6,567,571 B1 * | 5/2003 | Kochi et al. | .................... | 382/312 |
| 6,614,918 B1 * | 9/2003 | Fujita | ............................ | 382/112 |
| 6,760,682 B1 * | 7/2004 | Schwabe | ........................ | 702/150 |
| 6,764,185 B1 * | 7/2004 | Beardsley et al. | ............. | 353/122 |
| 6,829,372 B2 * | 12/2004 | Fujioka | ........................ | 382/103 |
| 6,909,516 B1 * | 6/2005 | Hoover | ......................... | 356/615 |
| 7,030,924 B2 * | 4/2006 | Hatase et al. | ................. | 348/324 |

(Continued)

FOREIGN PATENT DOCUMENTS

JP   01-287725   11/1989

(Continued)

Primary Examiner — Bhavesh Mehta
Assistant Examiner — Michelle Entezari
(74) Attorney, Agent, or Firm — Dickstein Shapiro LLP (57) ABSTRACT

An image forming apparatus includes a movable member that moves cyclically in synchronization with an image forming process and a position detector. The position detector includes a scale, an image sensor, a signal processor, and a position computing unit. The scale is attached to the movable member and includes a plurality of optical marks formed in line at a substantially constant interval. The image sensor captures data relating to at least one optical mark at a time. The signal processor computes a coordinate of the optical mark with respect to a reference position. The position computing unit computes a distance traveled by the optical mark based on a number of the optical marks that pass the reference position and the coordinate of the optical mark with respect to the reference position.

6 Claims, 7 Drawing Sheets

U.S. PATENT DOCUMENTS

| | | | |
|---|---|---|---|
| 7,053,393 B2 * | 5/2006 | Taniguchi et al. | 250/559.3 |
| 7,379,683 B2 * | 5/2008 | Kamiya et al. | 399/49 |
| 7,385,680 B2 * | 6/2008 | Tamaki et al. | 356/4.01 |
| 7,738,026 B2 * | 6/2010 | Cartlidge | 348/340 |
| 7,834,929 B2 * | 11/2010 | Okawara | 348/347 |
| 2004/0160646 A1 * | 8/2004 | Kudo et al. | 358/484 |
| 2005/0145794 A1 * | 7/2005 | Faubion | 250/330 |

FOREIGN PATENT DOCUMENTS

| | | |
|---|---|---|
| JP | 07-280521 | 10/1995 |
| JP | 2001-221659 | 8/2001 |
| JP | 2002-108031 | 4/2002 |
| JP | 2003-076486 | 3/2003 |
| JP | 2003-222504 | 8/2003 |
| JP | 2003-222505 | 8/2003 |
| JP | 2004-117010 | 4/2004 |
| JP | 2004-154947 | 6/2004 |
| JP | 2004-205308 | 7/2004 |
| JP | 2004-287337 | 10/2004 |
| JP | 2005-091912 | 4/2005 |
| JP | 2005-099728 | 4/2005 |
| JP | 2005-181090 | 7/2005 |
| JP | 2005-345359 | 12/2005 |
| JP | 2005-350195 | 12/2005 |
| JP | 2006-010855 | 1/2006 |
| JP | 2006-017615 | 1/2006 |
| JP | 2006-017975 | 1/2006 |
| JP | 2006-023465 | 1/2006 |
| JP | 2006-038943 | 2/2006 |
| JP | 2006-113825 | 4/2006 |
| JP | 2006-139029 | 6/2006 |
| JP | 2006-139214 | 6/2006 |
| JP | 2006-139216 | 6/2006 |
| JP | 2006-153676 | 6/2006 |
| JP | 2006-160512 | 6/2006 |

* cited by examiner

IMAGE FORMING APPARATUS INCLUDING POSITION DETECTOR

BACKGROUND OF THE INVENTION

1. Field of the Invention

The present invention generally relates to an image forming apparatus, and more particularly to an image forming apparatus including a position detector capable of detecting a relative position of and the distance traveled by a movable component and/or a rotational component.

2. Discussion of the Background

In general, image forming apparatuses that employ electrophotographic printing methods, such as copying machines, printers, facsimile machines, etc., include an image forming mechanism and movable elements, such as a photoconductor drum, a transfer belt, and/or a conveyance member. For example, in one electrophotographic printing method, the image forming mechanism forms an electrostatic latent image on a rotating photoconductor drum, develops it with toner, and transfers the developed image onto a recording sheet. The recording sheet is conveyed to the image forming mechanism by a conveyance belt.

A color image may be formed by superimposing images of different colors on top of one another. Images of different colors on a recording sheet or a transfer member may be displaced relative to each other when being superimposed, which blurs the color image. Therefore, positioning of the images is important to avoid position displacement among the different colors of a color image. Positioning may require detection of position, distance traveled, and/or speed of a movable element.

One type of image forming apparatus includes an image sensor to measure positional displacement. The image sensor reads an image on a movable part, compares the current image data with a previously read image data, and computes the position of the image. The above method is convenient since it requires only a detector and a reference scale is not required. However, extensive calculations may be required to accurately calculate the position or distance traveled by the image using only an image sensor.

One type of position detector may employ a method in which a correlation coefficient of density data of an optical mark is calculated and a position having a highest correlation is regarded as a relative displacement position. A large amount of calculation may be required because a correlative coefficient regarding every pixel is calculated.

Another type of image forming apparatus is provided with an encoder including a scale having a pattern in which optical marks are arranged at substantially constant intervals to detect and to measure the distance traveled by a movable element. The encoder detects position and/or speed of the movable element, measures them using the scale, and converts the measured values into electrical signals. However, to accurately calculate a relative position or distance traveled by a movable element, a highly accurate optical system and high quality scale and sensor are required. Furthermore, when optical marks are provided on a flexible or deformable component, variation may be caused in the intervals due to environmental factors, such as temperature and/or humidity.

SUMMARY OF THE INVENTION

Various embodiments disclosed herein describe an image forming apparatus that includes a position detector that may detect a relative position of a movable member. In one example embodiment, an image forming apparatus includes a position detector and a movable member that cyclically moves in synchronization with an image forming process. The position detector includes a scale, an image sensor, a signal processor, and a position computing unit. The scale is attached to the movable member and includes a plurality of optical marks formed in line at a substantially constant interval. The image sensor detects the scale at a constant cycle and reads at least one optical mark at a time. The signal processor computes a coordinate of the optical mark read by the image sensor from a reference position provided to the scale image. The position computing unit computes an absolute travel distance of the optical mark based on the coordinate of the optical mark and a number of the optical marks that pass the reference position.

Another embodiment includes a position detector which may detect a relative position of a movable member. The position detector includes a scale, an image sensor, a signal processor, and a position computing unit. The scale is attached to the movable member and includes a plurality of optical marks formed in line at a substantially constant interval. The image sensor detects the scale at a constant cycle and reads at least one optical mark at a time. The signal processor computes a coordinate of the optical mark read by the image sensor from a reference position provided to the scale. The position computing unit computes an absolute travel distance of the optical mark based on a number of the optical marks that pass the reference position and the coordinate of the optical mark.

Yet another embodiment includes a travel detector which may detect a rotation speed and a position of a rotationally movable member. A travel detector unit includes a scale, an image sensor, a signal processor, and a position computing unit. The scale is attached to the rotationally movable member and includes a plurality of optical marks formed in line at a substantially constant interval. The image sensor detects the scale image at a constant cycle and reads at least one optical mark at a time. The signal processor computes a coordinate of the optical mark read by the image sensor from a reference position provided to the scale image. The position computing unit computes an absolute travel distance of the optical mark based on a number of the optical marks that pass the reference position and the coordinate of the optical mark.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image forming apparatus 100 according to an embodiment of the present invention is described.

Figure 1:
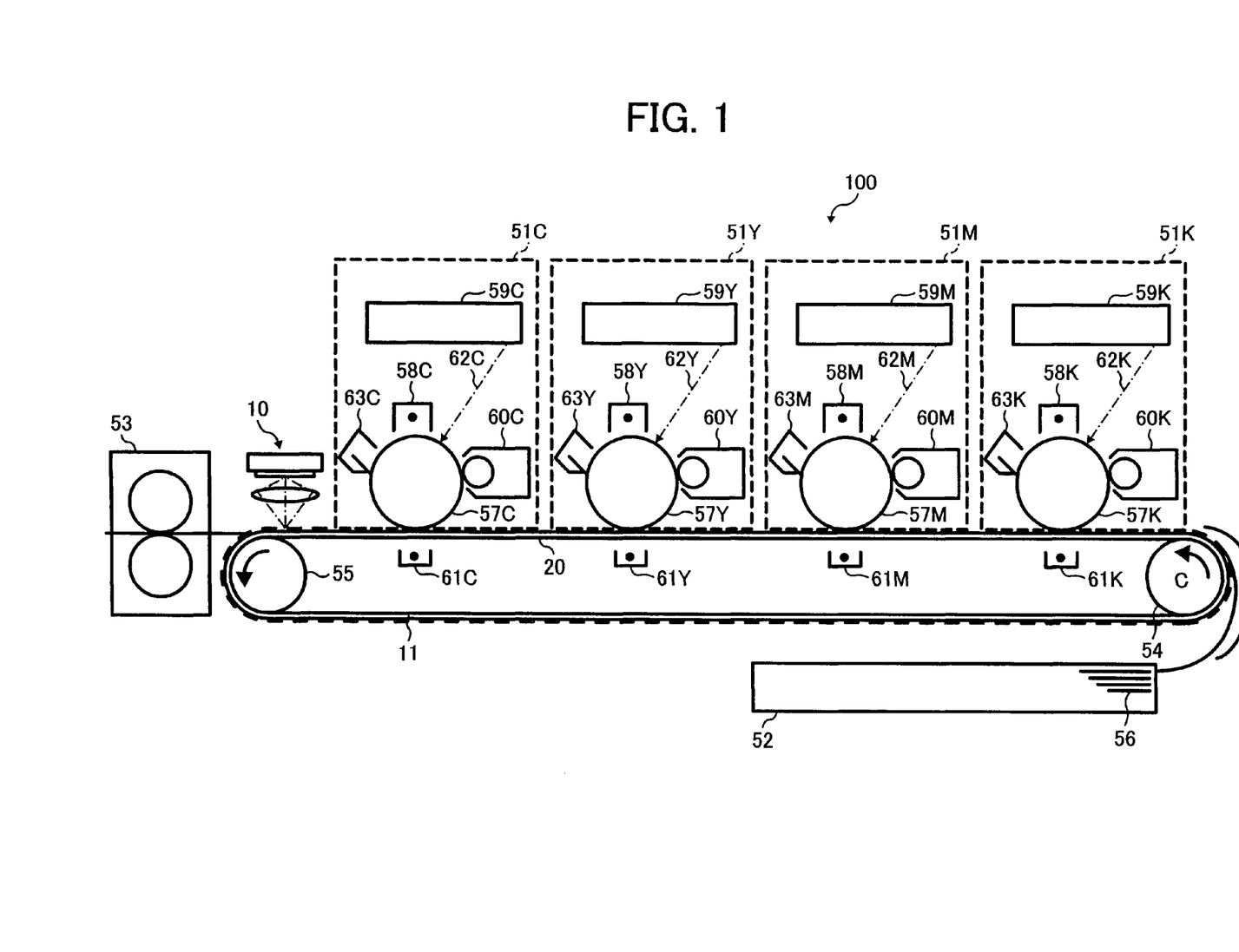
FIG. 1 is an illustration of an image forming apparatus according to an embodiment of the present invention.

The image forming apparatus 100 is a tandem image forming apparatus, and includes four individual image forming units. As illustrated in FIG. 1, the image forming apparatus 100 includes a relative position detector 10, a scale 11, a conveyance belt 20, and image forming units 51K, 51M, 51Y, and 51C for forming black, magenta, yellow, and cyan images, respectively. The image forming apparatus 100 further includes a paper feeding tray 52, a fixing unit 53, a driving roller 54, and a driven roller 55. The paper feeding tray 52 contains a sheet 56, such as one or more sheets of paper.

The image forming unit 51K includes a photoconductive drum 57K and a charging unit 58K, an exposure unit 59K, a development unit 60K, a transfer unit 61K, and a cleaner 63K located around the photoconductive drum 57K. The exposure unit 59K emits an exposure light 62K. Each of the other image forming units 51M, 51Y, and 51C has a similar configuration and a similar function to the image forming unit 51K. The relative position detector 10 may detect a relative position and speed of the conveyance belt 20. The scale 11 includes a plurality of optical marks formed at substantially constant intervals, and is attached to the conveyance belt 20. The relative position detector 10 senses that the optical mark is moving, and detects the relative position and speed of the conveyance belt 20. The relative position detector 10 and scale 11 are described in further detail below. The conveyance belt 20 is an endless belt, and is stretched between the driving roller 54 and driven roller 55. The driving roller 54 is driven to rotate, and drives the driven roller 55. The driving roller 54 causes the conveyance belt 20 to rotate in the direction of arrow C in synchronization with an image forming process.

The image forming units 51K, 51M, 51Y, and 51C are arranged in order along the conveyance belt 20. The top sheet 56 in the paper feeding tray 52 located below the conveyance belt 20 is sent to the conveyance belt 20 and adheres to an outer surface of the conveyance belt 20 by electrostatic adsorption. The sheet 56 is first sent to the image forming unit 51K provided at the uppermost stream in the moving direction of the conveyance belt 20.

In the image forming unit 51K, the charging unit 58K uniformly charges a circumference surface of the photoconductive drum 57K in a dark condition. In one example, the exposure unit 59K may be a laser scanner. In the exposure unit 59K, a laser beam from a laser source is reflected by a polygon mirror. The reflected laser light is then emitted as an exposure light 62K via an optical system employing an f-theta lens, a deflective mirror, and the like to form an electrostatic latent image on the photoconductive drum 57K. The developing unit 60K develops the electrostatic latent image on the photoconductive drum 57K into a visible black image using black toner. The transfer unit 61K transfers the black image onto the sheet 56 at a position where the photoconductive drum 57K is in contact with the sheet 56 on the conveyance belt 20. The cleaner 63K removes any remaining toner left on the photoconductive drum 57K after the black image is transferred to the sheet 56.

The sheet 56 on which the black image is formed is next sent to image forming unit 51M, in which a magenta image is superimposed on the black image in a process similar to that performed in image forming unit 51K. The sheet 56 is then sent to image forming unit 56Y, in which a yellow image is superimposed on the black and magenta images in a process similar to that performed in image forming unit 51K. The sheet 56 is then sent to image forming unit 56C, in which a cyan image is superimposed on the black, magenta, and yellow images on the sheet 56 in a process similar to that performed in image forming unit 51K to obtain a full color image on the sheet 56.

The sheet 56 on which the full color image is formed is removed from the conveyance belt 20 after passing through the image forming unit 51C. Next, the fixing unit 53 fixes the full color image on the sheet 56.

A belt conveyance unit 200 including the relative position detector 10 is described below with reference to FIG. 2.

Figure 2:
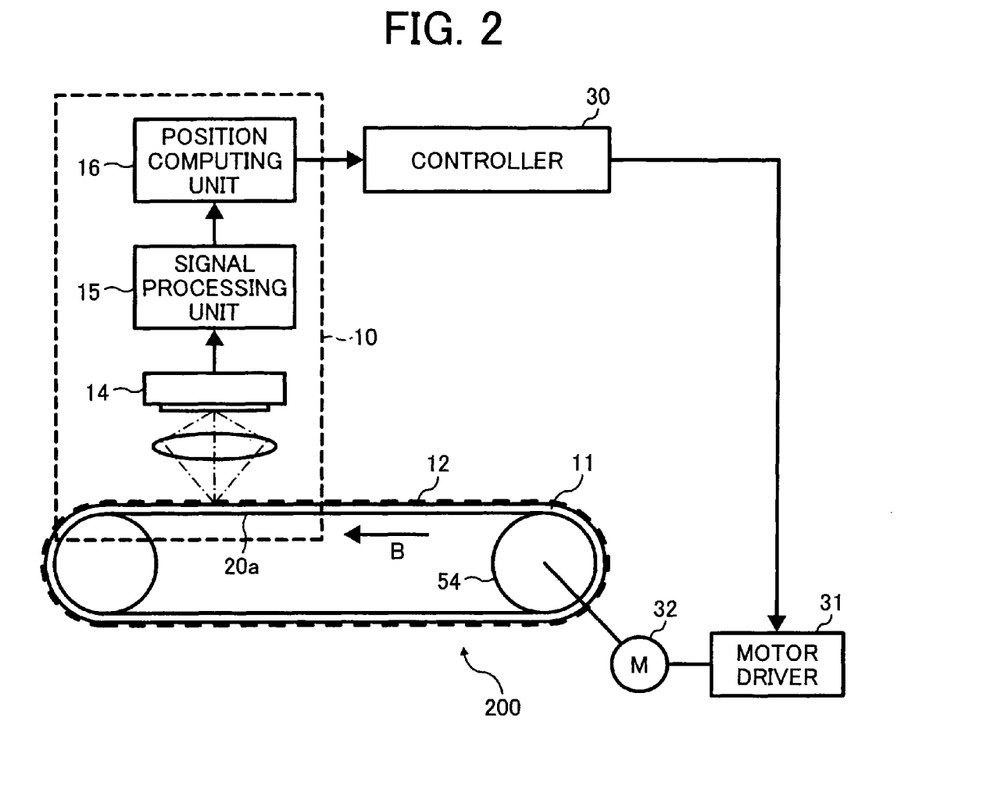
FIG. 2 is an illustration of a belt conveyance unit in which a relative position detector of FIG. 1 is applied.

As illustrated in FIG. 2, a belt conveyance unit 200 includes a conveyance belt 20a, a controller 30, a motor driver 31, a motor 32, and a driving roller 54. The belt conveyance unit 200 also includes a relative position detector 10 having a scale 11, an image sensor 14, a signal processor 15, and a position computing unit 16. A plurality of optical marks 12 are formed in the scale 11 at substantially constant intervals (pitch).

The conveyance belt 20a may be an endless belt stretched tightly around the driving roller 54. The driving roller 54 is driven by the motor 32, rotates and causes the conveyance belt 20a to move in the direction shown by arrow B. The controller 30 controls the motor driver 31. The scale 11 having the plurality of optical marks 12 is provided at a predetermined position on conveyance belt 20a, such as an edge of the conveyance belt 20a, so that the scale 11 encircles a periphery surface of the conveyance belt 20a. The optical marks 12 may display a predetermined reflectance or transmittance that is different from that of a base material of the scale 11 and/or the conveyance belt 20a.

The position detector 10 detects a relative position of the scale 11 attached to the movable conveyance belt 20a. A plurality of imaging elements, or pixels, arranged in the image sensor 14 may read an image of the scale 11 by capturing data relating to the scale 11 at constant cycles and converting the image to an electric signal. The signal processor 15 converts the image data obtained by the image sensor 14 into position measurement data. Based on the position measurement data, the position computing unit 16 computes a relative position of the scale 11. Using the relative position of the scale 11, a relative position and/or speed of the movable conveyance belt 20a may be obtained, and the controller 31 may control the motor driver 31 to adjust the movement of the conveyance belt 20a.

A CPU (central processor) or a DSP (digital signal processing) may be used as the controller 30. A common CPU or DSP may be used as the controller 30 and position computing unit 16 to simplify the configuration of the belt conveyance unit 200 if the position computation is executed programmatically.

The relative position detector 10 according to various embodiments is described below in detail with reference to FIGS. 3 and 4.

Figure 3:
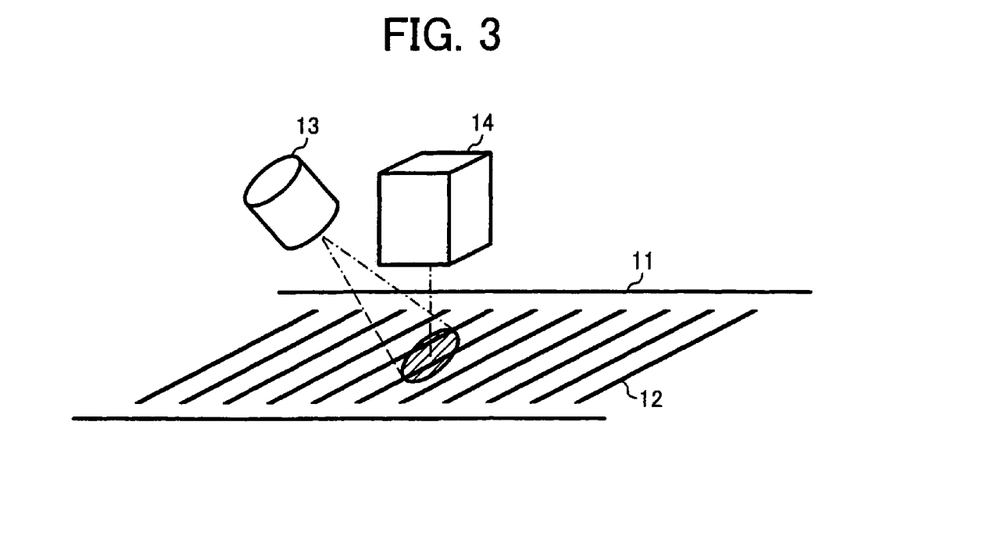
FIG. 3 is a schematic diagram illustrating the relative position detector of FIG. 2.
Figure 4:
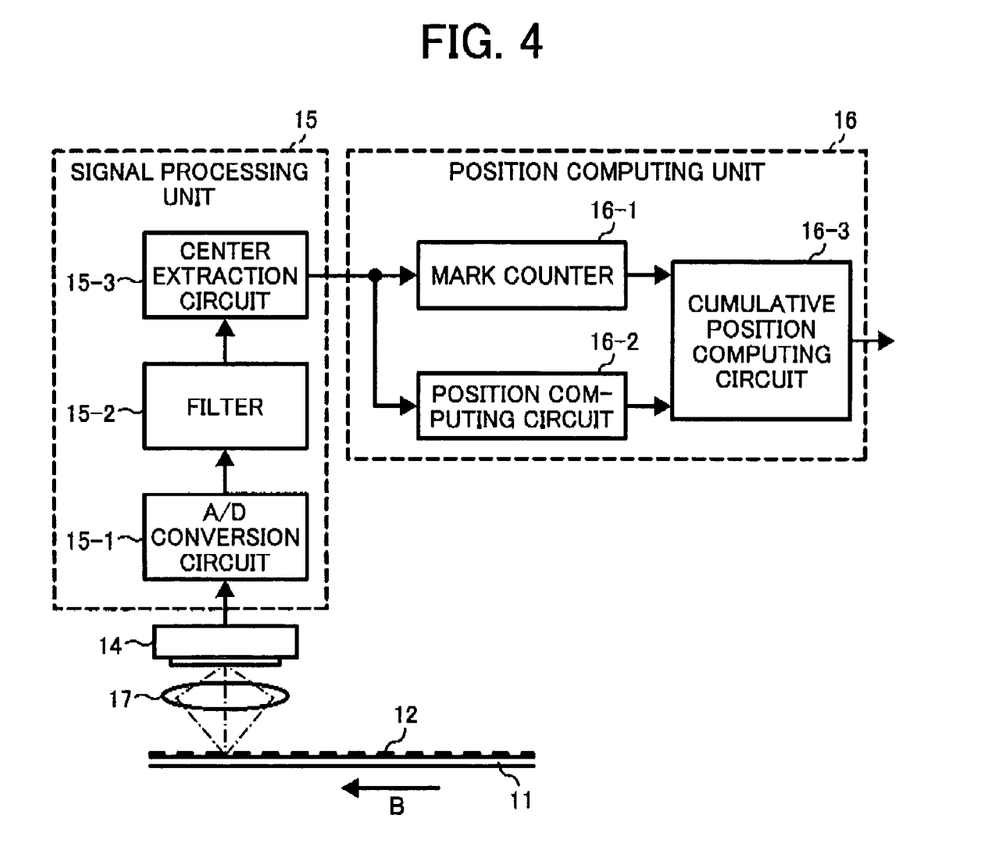
FIG. 4 is a block diagram of the relative position detector of FIG. 3.

FIG. 3 illustrates a schematic configuration of the relative position detector 10, and FIG. 4 is block diagram of the relative position detector 10. The relative position detector 10 further includes a light source 13 to irradiate the scale 11, as illustrated in FIG. 3, and an imaging lens through which an image of the optical mark 12 is imaged on a light receiving surface of the image sensor 14, as illustrated in FIG. 4.

As illustrated in FIG. 4, the signal processor 15 includes an analog to digital conversion circuit (A/D conversion circuit) 15-1, a filter 15-2, and a center extraction circuit 15-3. The position computing unit 16 includes a mark counter 16-1, a position computing circuit 16-2, and a cumulative position computing unit 16-3.

The optical marks 12 have a reflectance or transmittance that differ from the reflectance or transmittance of a base material of the scale 11 and/or the conveyance belt 20a. The optical marks 12 may be arranged in any pattern that causes the amount of light received by the image sensor 14 to fluctuate. The fluctuation of the amount of light received may cause a density difference on the image sensor 14, which is recognizable as the image. FIG. 3 illustrates a pattern of black lines on a white background as an example of the optical marks 12. Other examples of optical marks 12 include a pattern of white lines on a black background, a transmissive pattern of metal slits, or the like.

In one embodiment, the relative position detector 10 detects the movement of the optical mark 12. Therefore, image sensor 14 is configured to be capable of reading at least one optical mark 12, and the imaging lens 17 is configured to have a diameter capable of imaging at least one optical mark 12. The image sensor 14 reads the scale 11, which is moving in the direction of arrow B at constant cycles, by forming an image of the optical mark 12 in the scale 11 on the light receiving surface of the image sensor 14 through the imaging lens 17. Light receiving efficiency of the image sensor 14 may be improved by irradiating the scale 11 with the light source 13. As a result, the electric signal obtained by the image sensor may have an improved signal to noise (S/N) ratio.

Devices such as a charge-coupled device (CCD) or a complementary metal oxide semiconductor (CMOS) sensor may be used as the image sensor 14. An array of the imaging elements (pixels) may be a one-dimensional array (one-dimensional sensor) or a two-dimensional array (two-dimensional sensor).

The A/D conversion circuit 15-1 converts data obtained by the image sensor 14 into digital data by converting the image to density data according to the amount of light received by the image sensor 14. The filter 15-2 filters out noise in the data. The center extraction circuit 15-3 extracts center positions of the respective optical marks 12 from the density data (optical mark center data).

The mark counter 16-1 keeps track of the number of optical marks 12 that pass a reference position. The reference position may be a coordinate of a position on the light receiving surface of the image sensor 14, or a line on the light receiving surface of the image sensor 14 in a moving direction of the optical marks 12. The X-coordinate and Y-coordinate of the reference position are set to zero, respectively (X=0, Y=0). The position computing circuit 16-2 computes displacement (distance) of the optical mark 12 from the reference position. The cumulative position computing unit 16-3 computes a current position of the optical mark 12 based on the count of the mark counter 16-1 and the position (i.e. coordinates) of the optical mark 12 on the image sensor 14.

By using an image sensor in combination with a scale, the relative position detector 10 may provide high accuracy, stability, and high resolution in measuring a relative position of a movable and/or rotating component.

Figure 5:
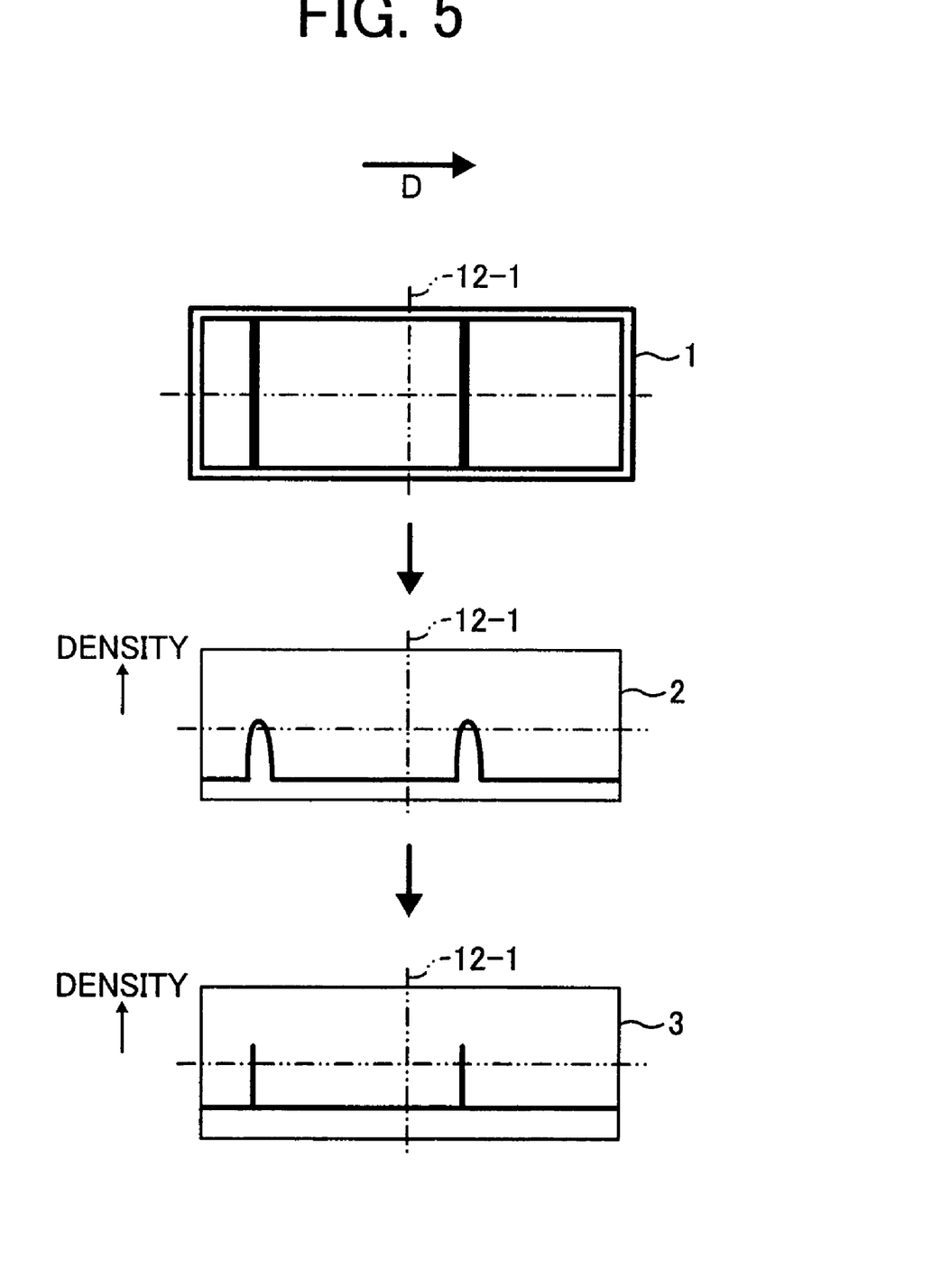
FIG. 5 is an illustration of example images on a light receiving surface of an image sensor of FIG. 4.

Functions of the signal processor 15 and position computing unit 16, and data processing is explained below with reference to FIG. 5. FIG. 5 illustrates example images 1, 2, and 3 on the light receiving surface of the image sensor 14. The example images 1, 2, and 3 include optical marks 12 and a reference position 12-1, respectively. Example image 1 is the image before A/D conversion, example image 2 is the density data after A/D conversion, and example image 3 is optical mark center data. The optical marks 12 are arranged in the direction of arrow D on the light receiving surface. In FIG. 5, two linear optical marks 12 are imaged.

As described above, the signal processor 15 converts the image data obtained by the image sensor 14 into position measurement data. If the image sensor 14 is a CCD, an analog signal synchronized with a clock is output. The image sensor 14 reads the image of the scale 11 at cycles corresponding to a required or desired resolution.

The A/D conversion circuit 15-1 converts the analog signal into a digital signal. If the image sensor 14 is a CMOS sensor, the image data may be read out by designating an address of the pixel and the data may be extracted by scanning the data. Thus, the data of the density difference according to the amount of light received by the image sensor 14 (density data) may be obtained as illustrated in image 2.

The mark center extraction circuit 15-3 extracts the center positions of the respective optical marks 12, generates the optical mark center data of the optical marks 12 as illustrated in image 3, and sends the optical mark center data to the position computing unit 16. The center positions of the optical marks 12 may be derived using methods such as a method in which a threshold level is set to determine the center of an up edge and a down edge, a method in which a center of gravity is figured out, or the like.

The position computing unit 16 receives the optical mark center data, which locates the position of the optical mark 12 on the image sensor 14, and converts the optical mark center data to relative position data on the scale 11, which locates a relative position of the optical mark 12 in real space of the image sensor 14 and the scale 11.

According to an embodiment described above, the mark counter 16-1 counts when the optical mark 12 read by the image sensor 14 passes the reference position 12-1, that is, the number of optical marks 12 that pass the reference position 12-1. Absolute distance traveled by the scale 11 may be calculated using the formula:

$$X = P \cdot N + d$$

in which X is the absolute travel distance of the scale 11, N is the count by the mark counter 16-1, P is the pitch between the optical marks 12, and d is the distance from the reference position 12-1 to the optical mark 12 that is a nearest optical mark to the reference position 12-1 in the moving direction of the scale 11.

Figure 6:
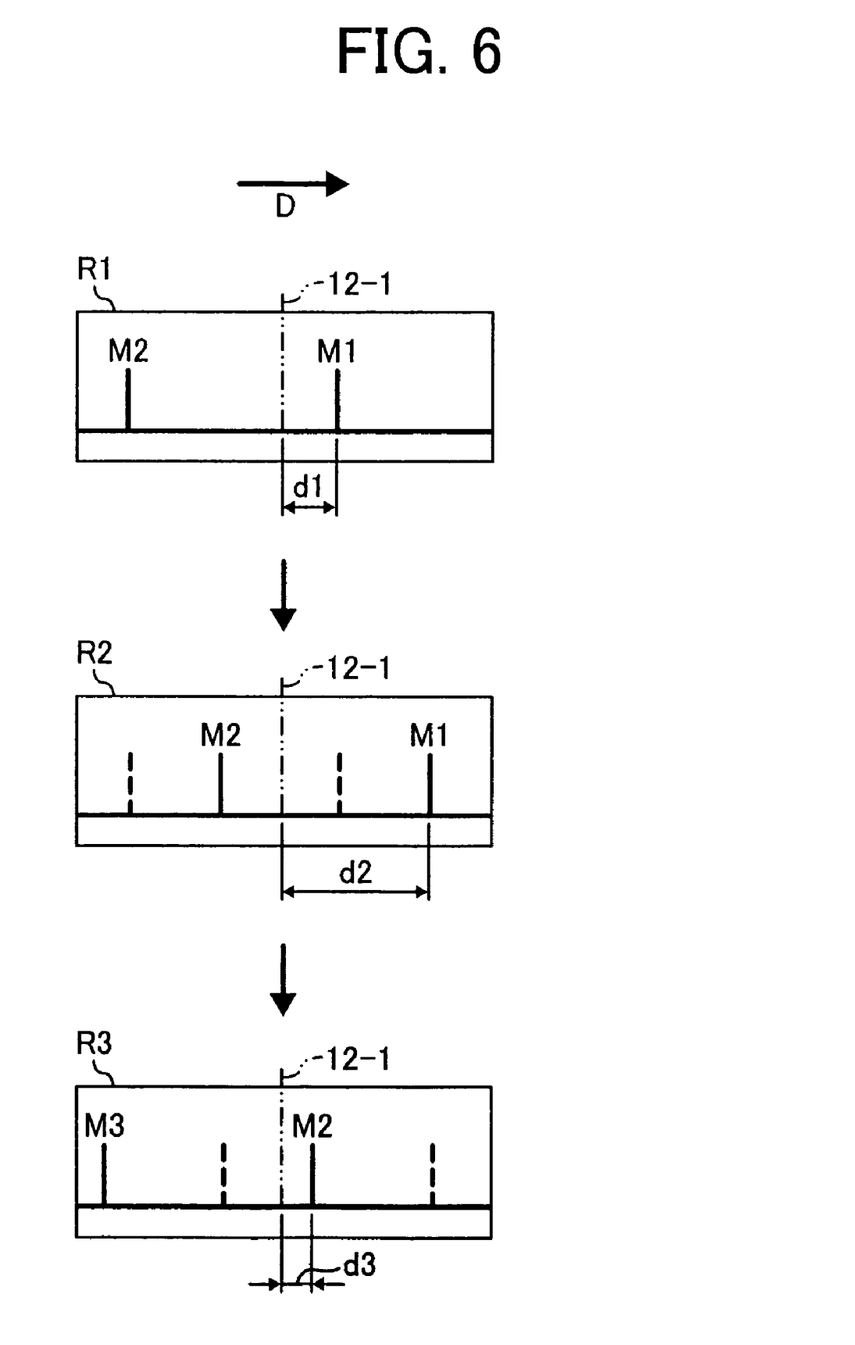
FIG. 6 is an illustration of examples of position measurement data by the image sensor of FIG. 4.

FIG. 6 illustrates examples of position measurement data R1, R2, and R3. Each of R1, R2, and R3 is accompanied by an example of a calculation of distance traveled by the optical mark 12 according to the above formula. In FIG. 6, a pitch P0 of optical marks 12, and optical mark centers M1, M2, and M3 are illustrated. The optical marks 12 move in the direction of arrow D. Distance between the reference position 12-1 and optical mark center M1 or M2 on the image sensor 14 is shown as d1, d2, or d3.

The measurement data R1 is obtained after the optical mark center M1 passes the reference position 12-1 and travels the distance d1. Therefore, the travel distance X in the measurement data R1 is P0·1+d1. Likewise, the travel distance X in the measurement data R2 is P0·1+d2. The measurement data R3 is obtained after two optical mark centers M1 and M2 pass the reference position 12-1 and travel the distance d3. Therefore, the travel distance X in the measurement data R3 is P0·2+d3.

In an embodiment described above, the optical mark center position data may be generated from density data according to the amount of light received by the image sensor, and travel distance of the scale may be calculated by computing the center position of the optical mark. The cumulative travel distance of the scale 11 may be calculated by using the number of optical marks 12 that pass a reference position on the image sensor and the current distance d of the optical mark 12 from the reference position, instead of accumulating the travel distance of the optical mark. Therefore, position detection may be performed according to the accuracy of the optical mark. The functions described above may be achieved by using software or a gate array, which is described below.

It is difficult to provide optical marks at accurate intervals on a flexible component, for example, on an intermediate transfer belt. Further, if the flexible component is deformable due to temperature and/or humidity optical marks on the flexible component may be placed at erroneous intervals.

Therefore, an image sensor according to an embodiment is configured to be capable of detecting at least two optical marks in a scale at a time. The detected optical marks are imaged on the image sensor, and an interval (pitch) of the optical marks is computed based on the images on the image sensor. Based on the computed interval of the optical marks, the distance traveled by the scale may be corrected.

Figure 7:
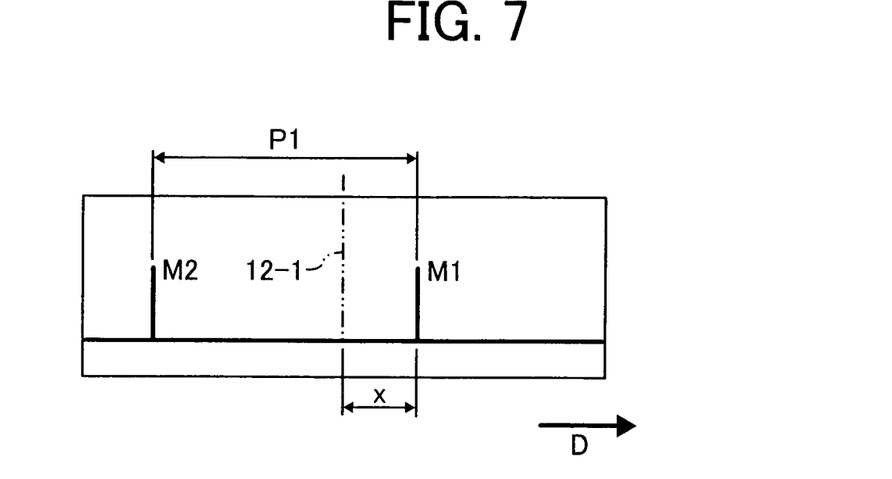
FIG. 7 is an illustration of an example of position measurement data by the image sensor of FIG. 4.

To detect at least two optical marks 12 as described above, the image sensor 14 is configured to be larger than the width of two optical marks 12 and the distance between them (pitch). When the pitch of the optical mark 12 is P and the width of the optical mark 12 is o, the size of the image sensor 14, S, is expressed as follows.

$$S > P + o \cdot 2.$$

In FIG. 7, the optical center positions M1 and M2 of optical marks 12 and the pitch P(1) are illustrated. When optical marks are not arranged at an accurate pitch on a scale, or highly accurate measurement is required, a position of the optical mark 12 may be calculated by using the following formula:

$$x = \sum_{k=1}^{n} (P(k)) + x$$

where X is the position of the optical mark 12, x is the distance of the optical mark center M1 from the reference position 12-1, Σ represents summation of a set of natural numbers from 1 to n, k is an arbitrary number in the set, and n is a largest number in the set.

Therefore, highly accurate cumulative position measurement may be performed because a value of the pitch of the optical marks is corrected during the computation of distance traveled.

Figure 8:
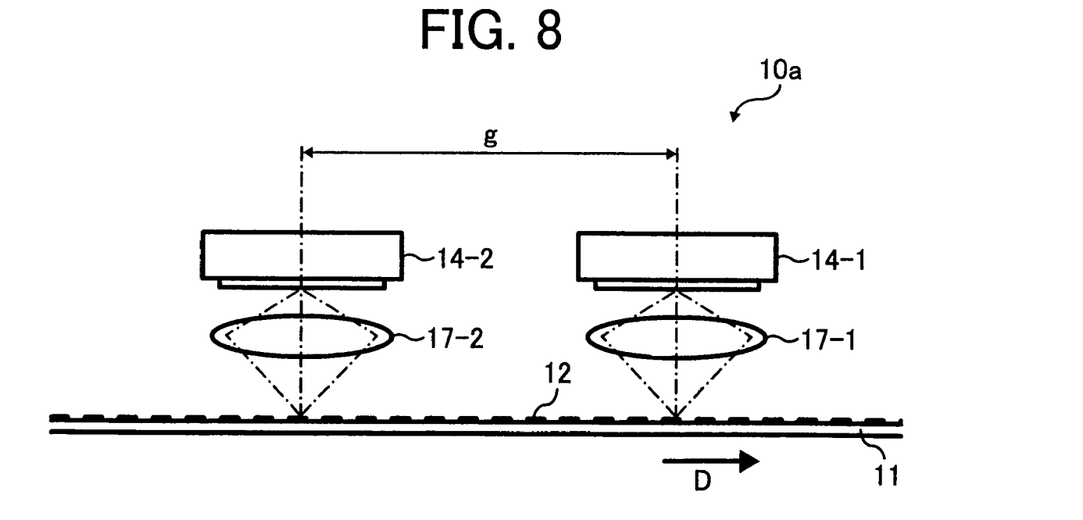
FIG. 8 is an illustration of a relative position detector according to an embodiment of the present invention.

FIG. 8 illustrates a relative position detector 10a according to an embodiment of the present invention. In FIG. 8, the relative position detector 10a includes a scale 11, a plurality of optical marks 12, image sensors 14-1 and 14-2, and imaging lenses 17-1 and 17-2. The scale 11 moves in the direction of arrow D. The image sensors 14-1 and 14-2 are provided at an interval g. A plurality of image sensors 14-1 and 14-2 are provided along the traveling direction of the scale 11. The interval g is expressed as g=N·P0, wherein N is the count by the mark counter 16-1 and P0 is the pitch of optical marks 12. An image of the scale 11 is imaged on the image sensor 14-1 through the imaging lens 17-1. Likewise, an image of the scale 11 is imaged on the image sensor 14-2 through the imaging lens 17-2.

Figure 9:
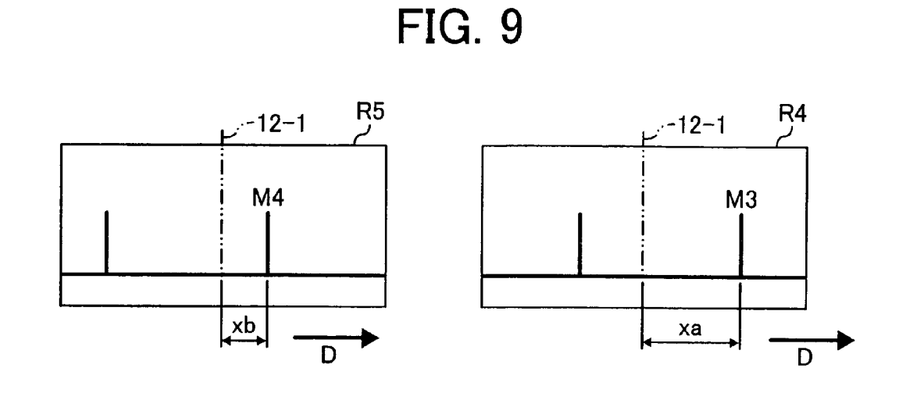
FIG. 9 is an illustration of examples of position measurement data by image sensors of FIG. 8.

FIG. 9 illustrates position measurement data R4 and R5. The position measurement data R4 is data of the optical marks 12 obtained by image sensors 14-1, and position measurement data R5 is data of the optical mark 12 obtained by the image sensor 14-2. In the position measurement data R4 and R5, reference positions 12-1 and optical mark centers M3 and M4 are included. An error in the pitch P0 is expressed as xa−xb, where distance between M3 and the reference position 12-1 on the image sensor 14-1 is xa and distance between M4 and the reference position 12-1 on the image sensor 14-2 is xb. The image sensors 14-1 and 14-2 are placed at interval g, as above. Based on the error xa-xb, a new pitch P' may be calculated by using a following formula.

$$P' = P0 + (xa - xb)/N$$

Therefore, the pitch used in the calculation of the travel distance of the scale 11 may be corrected to the new pitch P'. In other respects, the relative position detector 10a may have a similar configuration and function to the relative position detector 10 illustrated in FIG. 4.

When the image sensors 14-1 and 14-2 are provided at a distance in which the optical marks 12 are counted N times as described above, the error in the pitch of the optical marks 12 is magnified N times. That is, pitch of optical marks may be corrected accurately by providing image sensors spaced a distance from each other, which magnify errors in the pitch of the optical marks.

Figure 10:
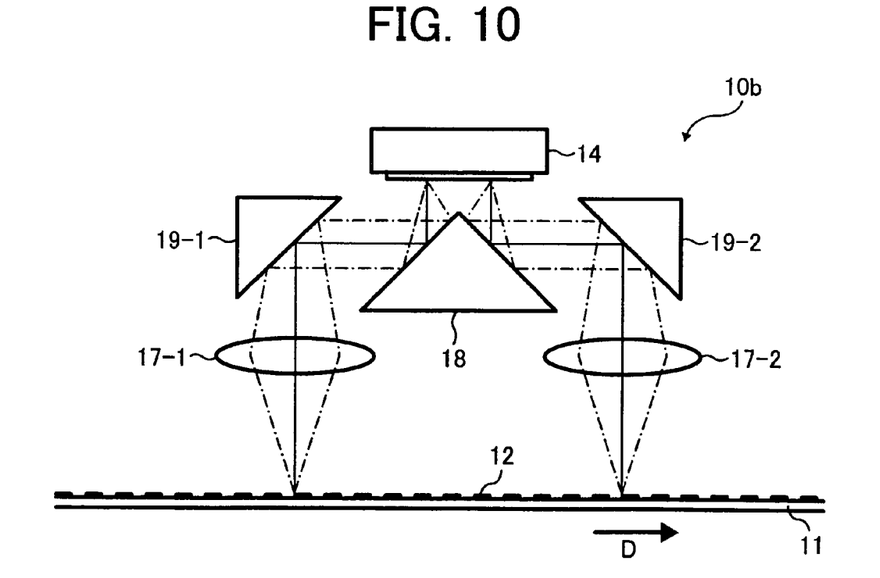
FIG. 10 is an illustration of a relative position detector according to an embodiment of the present invention.

FIG. 10 illustrates a relative position detector 10b according to an embodiment of the present invention. In FIG. 10, the relative position detector 10b includes a scale 11, a plurality of optical marks 12, an image sensor 14, imaging lenses 17-1, and 17-2, and mirrors 18, 19-1, and 19-2. The scale 11 is moving in the direction of arrow D. The imaging lenses 17-1 and 17-2, and the mirrors 18, 19-1, and 19-2 function as an integrated optical system. This relative position detector 10b is an example in which different portions of the scale 11 are imaged on the single image sensor 14 through the integrated optical system. In other respects, the relative position detector 10b may have a similar configuration and function to the relative position detector 10a of FIG. 8.

The single image sensor 14 may process images and compute center positions of the optical marks 12 because the relative position detector 10b is capable of imaging different portions of the scale 11 on a single image sensor 14. Therefore, efficiency may be improved and cost may be reduced. Further, the pitch of the optical marks 12 may be accurately corrected, because the different portions of the scale 11 are measured to correct the pitch.

Although an integrated optical system including mirrors is described in the above embodiment, alternatively, an optical system using image transfer by image fibers and/or a refracting optical system using a prism may be applied to the image sensor. Further, a two-dimensional image sensor may be used. In such a case, two-dimensional displacement measurement may be performed by using a scale arranged in two dimensions. Further, a photodiode array may be used instead of an image sensor.

As described above, according to various embodiments of the present invention, the distance traveled by a movable component on which a scale is provided may be measured while correcting the pitch of optical marks on a belt-like component that may be deformed due to environmental influence.

The relative position detector according to the various embodiments may be used to detect the position of a component. For example, the relative position detector may detect a relative position and/or speed of a rotationally movable component, such as a photoconductor drum, despite the fact that it is difficult to approximate an encoder head to a rotating component having a cylindrical surface because the height of a portion to be detected changes. Therefore, the speed of such a rotationally movable component may be stabilized, and a highly accurate image may be formed.

Numerous additional modifications and variations are possible in light of the above teachings. It is therefore to be understood that within the scope of the appended claims, the disclosure of this patent specification may be practiced otherwise than as specifically described herein.

This patent specification claims priority under 35 U.S.C. §119 to Japanese patent applications, No. JP-2005-301128 filed on Oct. 17, 2005 and No. JP-2006-252385 filed on Sep. 19, 2006 in the Japan Patent Office, the entire contents of which are incorporated by reference herein.

What is claimed is:

1. An image forming apparatus, comprising:
an electrophotographic image forming element configured to move cyclically and to convey toner to a recording sheet;
a movable member configured to move cyclically in synchronization with the electrophotographic image forming element and to convey the recording sheet to the electrophotographic image forming element; and
a position detector comprising:
a scale attached to the movable member and including a plurality of optical marks formed in line at a substantially constant interval,
an image sensor configured to capture an image of at least two of the plurality of optical marks and the interval between the at least two optical marks at a time, the image sensor further configured to be larger than the width of two of the plurality of optical marks and the interval between the two optical marks,
a signal processor configured to determine a coordinate of an optical mark with respect to a reference position using the data captured by the image sensor, and
a position computing unit configured to compute a distance traveled by at least one of the optical marks based on a number of the optical marks that pass the reference position and the coordinate of the at least one optical mark with respect to the reference position and to determine the value of the interval between the at least two optical marks based on the image of the at least two optical marks.

2. The image forming apparatus according to claim 1, wherein the plurality of optical marks have a predetermined difference in reflectance or transmittance from a base material of the scale.

3. The image forming apparatus according to claim 1, wherein the position computing unit is further configured to correct the distance traveled by the at least one optical mark based on the determined value of the interval between the at least two optical marks.

4. The image forming apparatus according to claim 1, wherein the image sensor is a two-dimensional image sensor, and the plurality of optical marks are arranged in two dimensions in the scale.

5. A position detector, comprising:
a scale attached to a movable member and including a plurality of optical marks formed in line at a substantially constant interval;
an image sensor configured to capture an image of at least two of the plurality of optical marks and the interval between the at least two optical marks at a time, the image sensor further configured to be larger than the width of two of the plurality of optical marks and the interval between the two optical marks;
a signal processor configured to determine a coordinate of an optical mark with respect to a reference position using the data captured by the image sensor; and
a position computing unit configured to compute a distance traveled by the optical mark based on a number of the optical marks that pass the reference position and the coordinate of the optical mark with respect to the reference position and to determine the value of the interval between the at least two optical marks based on the image of the at least two optical marks.

6. A travel detector for detecting a rotation speed and a position of a rotationally movable member, comprising:
a scale attached to a rotationally movable member and including a plurality of optical marks formed in line at a substantially constant interval;
an image sensor configured to capture an image of at least two of the plurality of optical marks and an interval between the two optical marks at a time, the image sensor further configured to be larger than the width of two of the plurality of optical marks and the interval between the two optical marks;
a signal processor configured to determine a coordinate of an optical mark with respect to a reference position using the data captured by the image sensor; and
a position computing unit configured to compute a distance traveled by the optical mark based on a number of the optical marks that pass the reference position and the coordinate of the optical mark with respect to the reference position and to determine the value of the interval between the at least two optical marks based on the image of the at least two optical marks.

* * * * *